Figure 1:
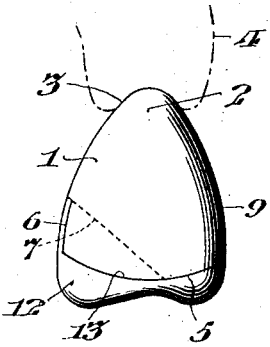

Sept. 11, 1928.  C. C. HALLOWELL  1,683,614

ARTIFICIAL TOOTH

Filed April 6, 1926

Inventor
Clifton C. Hallowell
Attorney

Patented Sept. 11, 1928.

1,683,614

UNITED STATES PATENT OFFICE.

CLIFTON C. HALLOWELL, OF DREXEL HILL, PENNSYLVANIA, ASSIGNOR TO THE S. S. WHITE DENTAL MANUFACTURING COMPANY, A CORPORATION OF PENNSYLVANIA.

ARTIFICIAL TOOTH.

Application filed April 6, 1926. Serial No. 100,038.

My invention relates particularly to that class of artificial teeth commonly known as pontic teeth, in which the tooth-body is arranged to be supported upon its occlusally disposed end and has its root end extended to engage in the socket from which a natural tooth root has been extracted, for the purpose of preventing or arresting the absorption of the gums, and is especially directed to the form of the occlusally disposed end whereby it is guided into position and retained by its cooperation with the inner face of the cusp structure included in a bridge, or other convenient form of support.

The principal objects of my invention are to provide an artificial tooth with a convexed occlusally disposed end face that may be so cooperative with a correspondingly concaved inner end face of a supporting cusp structure as to effect a rocking motion of the tooth-body when moved into or out of operative position, while its root end is engaged in the gum socket.

Other objects of my invention are to provide an artificial tooth so constructed and arranged as to avoid the formation of sharp or acute angled edges on the porcelain tooth-body, which might tend to be chipped off or be otherwise marred or fractured.

My invention further includes an artificial tooth comprising a tooth-body and a cusp structure, respectively having their opposed end faces provided with interengaging means whereby they may be guided and removably engaged, when the tooth-body is rocked into operative position with respect to its cusp structure.

My invention comprehends an artificial tooth comprising a tooth-body and cusp structure respectively having their opposed end faces formed of cooperative plane and curved surfaces affording guiding and interengaging means that may be readily trued to facilitate their assemblage and afford proper registry.

Specifically stated, the form of my invention as hereinafter described, comprehends a tooth-body having a root extension preferably terminating in an apex of conoidal formation, and a convexed occlusally disposed end face provided with a slot or recess directed forwardly and terminating short of the outside lateral face of said tooth-body, and a cusp structure arranged to support the tooth-body, and having a similarly concaved inner end face conforming to the convexed end face of said tooth-body, and provided with means projecting therefrom, complementary to the slot or recess in said tooth-body, and arranged to so interengage with said slot or recess as to tend to maintain the convexed and concave end faces respectively of said tooth-body and cusp structure in proper registry.

My invention also includes all of the various novel features of construction and arrangement as hereinafter more definitely specified.

Figure 2:
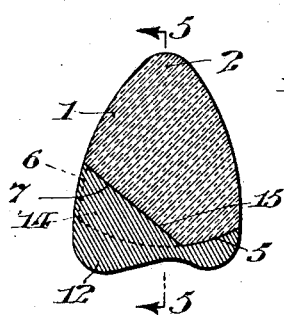
Figure 3:
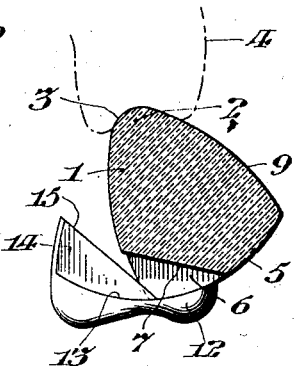
Figure 4:
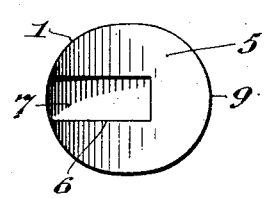
Figure 5:
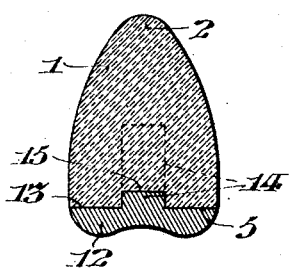
Figure 6:
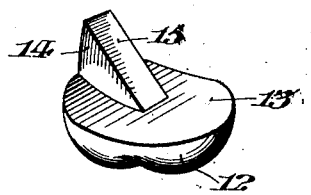
Figures 7, 8:
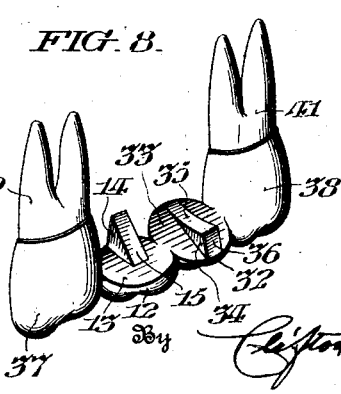

In the accompanying drawings, Figure 1 is a side elevational view of an artificial tooth constructed in accordance with my invention, and comprises a relatively separable tooth-body and cusp structure; Fig. 2 is a central vertical longitudinal sectional view of the tooth structure shown in Fig. 1; Fig. 3 is a central vertical longitudinal sectional view of the tooth-body in the act of rocking into operative position on the cusp structure, which is shown in elevation for convenience of illustration; Fig. 4 is an inverted plan view of the tooth-body per se; Fig. 5 is a transverse vertical sectional view of the tooth structure shown in Fig. 2, taken on the line 5—5 in said figure; Fig. 6 is a perspective view of the cusp structure per se; Fig. 7 is a central vertical longitudinal sectional view of a slightly modified form of my invention; and Fig. 8 is a perspective view of a piece of bridgework embodying two cusp structures respectively shown in Figs. 6 and 7 supported by relatively spaced caps carried on natural teeth, forming abutments for the bridge structure.

In said figures, the tooth-body 1 has the apical root extension 2 arranged to be extended into the root socket 3 of the gum ridge 4, which is shown in dot-and-dash lines in Figs. 1 and 3. The tooth-body 1 has the occlusally disposed convexed end face 5, which is preferably curved about the apical root extension 2 as a center, and which is provided with a slot or recess 6, opening through said convexed occlusally disposed end face 5.

As best shown in Fig. 3, the slot or recess 6, preferably has the plane surface 7 obliquely inclined with respect to the curved occlusally disposed end face 5, and extends toward the outer lateral face 9 of the tooth-body 1, but terminates in the occlusally disposed end face 5.

The tooth-body 1 is arranged to be supported by the cusp structure 12 having its inner end face 13 concaved to conform to the occlusally disposed convexed end face 5 of said tooth-body 1. Said cusp structure 12 is provided on the said concaved end face 13, with a fin or projection 14, complementary to the recess 6 in the tooth-body 1, and comprising the obliquely inclined plane surface 15 extending outward in converged relation to the face 13 so as to interengage in the slot or recess in the tooth-body 1 and insure the proper registry of said tooth-body with the cusp structure 12.

In the form of my invention shown in Figure 7, the tooth-body 21 has the apical root extension 22, and the occlusally disposed end face 25. Said face 25 is extended in a plane directed occlusally outward toward the outer occlusal edge 26 of the tooth-body, and has the recess 27, the inner face 28 of which is convexed about the apical root extension 22 and terminates within the tooth-body 21 short of the outer lateral face 29 of said tooth-body. The face 28 of said recess 27 merges into the sharply inclined abutment surface or wall 30 forming the outer wall of the recess 27.

The tooth-body 21 is arranged to be supported by the cusp structure 32 having its inner end face 33 inclined to conform to the occlusally disposed end face of the tooth-body 21. Said cusp structure is provided on its inclined end face 33 with a fin or projection 34 complementary to the recess 27 in the tooth-body 1, and comprising the concaved face 35, arranged to conform to the convexed face 28 of the recess in the tooth-body 21, and the inclined end wall 36 serving as an abutment for the abutment wall 30 in said recess 27.

It will be obvious that in this form of my invention the tooth-body 21 may be rocked into registry with the cusp structure 32, by sliding the convexed face 28 of said tooth-body 21 upon the concaved face 35 of the cusp structure until the abutment wall 30 of the tooth-body engages the abutment wall 36 of the cusp structure 32.

The cusp structures 12 and 32 may be supported in any suitable manner to afford a mounting for the tooth-bodies 1 and 21, such, for instance, as shown in Fig. 8, wherein the cusp structures 12 and 32 are disposed side by side between the caps 37 and 38, to which they are soldered to form an integral bridge structure, said caps 37 and 38 being carried by natural tooth root abutments 40 and 41 respectively.

My invention is advantageous in that by forming the occlusally disposed surface of the tooth-body convexed, and the inner surface of the cusp structure correspondingly concaved, the apical root extension may be first inserted into the extracted tooth socket and the tooth-body rocked into place about an axis so disposed that said apical root extension will rotate in said socket.

I do not desire to limit my invention to the precise details of construction and arrangement as herein set forth, as it is obvious that various modifications may be made therein without departing from the essential features of my invention as defined in the appended claims.

Having thus described my invention, I claim:

1. An artificial tooth comprising a tooth-body having a root extension, and a convexed occlusally disposed end face provided with a recess having a plane wall inclined in outwardly converging relation to said convexed occlusally disposed end face.

2. An artificial tooth comprising a tooth-body having a root extension, and a convexed occlusally disposed end face provided with a recess having a plane wall inclined in outwardly converging relation to said convexed occlusally disposed end face, and a cusp structure having a similarly concaved inner end face substantially conforming to said convexed end face and provided with means arranged to enter said recess.

3. An artificial tooth comprising a tooth-body having a root extension, and a convexed occlusally disposed end face provided with a recess having a plane wall inclined in outwardly converging relation to said convexed occlusally disposed end face, and a cusp structure having a similarly concaved inner end face substantially conforming to said convexed end face and provided with a fin arranged to enter said recess and having an inclined face cooperative with the inclined wall of said recess to limit the relative movement of said tooth-body and cusp structure.

4. An artificial tooth comprising a cusp structure and a separable tooth-body having an apical root extension about which the opposed faces of said tooth-body and cusp structure are curved, said tooth-body and cusp structure being respectively provided with a recess and fin each having an inclined surface converging toward and terminating in said curved surfaces.

5. An artificial tooth comprising a cusp structure and a replaceable tooth-body having an apical root extension about which the opposed faces of said tooth-body and cusp structure are curved, said tooth-body and cusp structure being respectively provided with a recess and a flangeless fin interengaging to effect registry of said tooth-body with said cusp structure, but permitting their relative movement in the direction of the axis of said tooth-body.

6. An artificial tooth comprising a cusp structure and a replaceable tooth-body having an apical root extension, the opposed faces of which each comprise a surface curved about said apical root extension and a plane surface in oblique angular relation to said curved surface.

7. An artificial tooth comprising a tooth-body and a cusp structure arranged to support said tooth-body, each having opposed faces constructed and arranged to permit the tooth-body to be rocked into operative position upon the cusp structure, while the root end of the tooth-body is rotatably engaged in the gum socket and the cusp structure is rigidly supported in spaced relation to said gum socket, and each having oppositely disposed means complementary to guide the opposed surfaces in slidable relation into registry, and comprising a recess having a fin whose base is of its maximum width.

8. An artificial tooth comprising a tooth-body having a root extension, and a convexed occlusally disposed end face provided with a recess having its inner wall inclined in outwardly converging relation to said convexed occlusally disposed end face.

In witness whereof, I have hereunto set my hand this fifth day of April, A. D. 1926.

CLIFTON C. HALLOWELL.